United States Patent
Lii et al.

(10) Patent No.: US 11,958,188 B2
(45) Date of Patent: Apr. 16, 2024

(54) MODULAR END EFFECTOR

(71) Applicant: Deutsches Zentrum für Luft- und Raumfahrt e.V., Cologne (DE)

(72) Inventors: Neal Yi-Sheng Lii, Munich (DE); Julian Dietl, Munich (DE); Zhaopeng Chen, Gilching (DE); Benedikt Pleintinger, Germering (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 379 days.

(21) Appl. No.: 16/766,007

(22) PCT Filed: Nov. 23, 2018

(86) PCT No.: PCT/EP2018/082343
§ 371 (c)(1),
(2) Date: May 21, 2020

(87) PCT Pub. No.: WO2019/101908
PCT Pub. Date: May 31, 2019

(65) Prior Publication Data
US 2020/0276701 A1   Sep. 3, 2020

(30) Foreign Application Priority Data
Nov. 23, 2017 (DE) .................. 10 2017 220 999.2

(51) Int. Cl.
*B25J 9/08*     (2006.01)
*B25J 15/00*    (2006.01)

(52) U.S. Cl.
CPC ............. *B25J 9/08* (2013.01); *B25J 15/0019* (2013.01)

(58) Field of Classification Search
CPC .... B25J 15/0009; B25J 15/10; B25J 15/0061; B25J 15/08; B25J 15/0052; B25J 15/0019; B25J 9/08
See application file for complete search history.

(56) References Cited

U.S. PATENT DOCUMENTS

| | | | | |
|---|---|---|---|---|
| 5,108,140 A | * | 4/1992 | Bartholet | B25J 15/0009 294/115 |
| 5,501,498 A | * | 3/1996 | Ulrich | B25J 13/084 294/111 |
| 6,918,622 B2 | * | 7/2005 | Kim | B25J 15/10 901/34 |
| 8,585,111 B2 | * | 11/2013 | Nammoto | B25J 15/10 901/38 |
| 9,844,885 B2 | * | 12/2017 | Wong | B25J 15/022 |
| 10,105,853 B1 | * | 10/2018 | Hwang | B25J 9/1005 |

(Continued)

FOREIGN PATENT DOCUMENTS

| | | |
|---|---|---|
| CN | 106625621 A | 5/2017 |
| CN | 107214720 A | 9/2017 |

(Continued)

*Primary Examiner* — Jake Cook
(74) *Attorney, Agent, or Firm* — The Webb Law Firm

(57) ABSTRACT

A modular end effector with a base with at least one connection element, a manipulator, in particular interchangeable with the connection element connected is disclosed. The position of the connection element and/or the position of the manipulator within the connection element can be changed so that the manipulator can be used in different positions relative to a base to create a versatile modular end effector.

20 Claims, 6 Drawing Sheets

(56) References Cited

U.S. PATENT DOCUMENTS

| | | | |
|---|---|---|---|
| 2006/0012197 A1* | 1/2006 | Anderson | B25J 15/0028 294/106 |
| 2007/0164009 A1 | 7/2007 | Hesse | |
| 2010/0176615 A1 | 7/2010 | Okuda et al. | |
| 2014/0132018 A1 | 5/2014 | Claffee et al. | |
| 2017/0151679 A1 | 6/2017 | Wong et al. | |

FOREIGN PATENT DOCUMENTS

| | | |
|---|---|---|
| DE | 20306257 U1 | 9/2004 |
| DE | 202005020915 U1 | 12/2006 |
| DE | 102015107394 A1 | 11/2016 |
| JP | 2006255805 A | 9/2006 |
| JP | 2007222971 A | 9/2007 |
| JP | 2008178939 A | 8/2008 |
| JP | 2012171019 A | 9/2012 |

* cited by examiner

MODULAR END EFFECTOR

CROSS-REFERENCE TO RELATED APPLICATIONS

This application is the United States national phase of International Application No. PCT/EP2018/082343 filed Nov. 23, 2018, and claims priority to German Patent Application No. 10 2017 220 999.2 filed Nov. 23, 2017, the disclosures of which are hereby incorporated by reference in their entirety.

BACKGROUND OF THE INVENTION

The invention relates to a modular end effector and a robot with such a modular end effector.

Known end effectors for robots exist in a variety of configurations and may as such be modeled on the human hand or be implemented as simple grippers. Here, an adaptation of the end effectors to the tasks to be solved often occurs already during the construction of the respective end effector. Thus, a specific end effector is assigned to a dedicated task or a small number of dedicated tasks. Moreover, there are also interchangeable end effectors that can be exchanged on the robot when the task is changed. However, the task is often already known in the construction of the respective end effector, so that, for example, when two tasks are to be performed by the robot, two end effectors are constructed as well which may then be exchanged when the tasks are changed. However, when new tasks are added, this usually requires a new design of a correspondingly adapted end effector, which takes into account the requirements of this new task. The capabilities of existing humanoid robotic hands are limited by the similarity to the human hand. For example, the size of the objects that can be gripped is limited. Existing simple, versatile grippers are often unable to reach the position of the gripped object with respect to the robot in a defined manner and are also unable to detect it.

Furthermore, it is known to provide end effectors equipped with interchangeable tools. However, also in this case, the versatility of the end effector is severely limited, since it may be possible to change the tools, yet basically different tasks cannot be accomplished by the end effector. Thus, all tasks to be accomplished must be known at the time the end effector is designed. It is possible to use different tools within the same task to be accomplished, but changing the task to be performed usually requires a new design for the end effector.

SUMMARY OF THE INVENTION

It is an object of the present invention to provide a versatile end effector.

The object is achieved by a modular end effector and a robot as defined herein.

The modular end effector of the present invention comprises a base with at least one connection element. A manipulator is connected to the connection element. Here, the manipulator can be chosen in particular with regard to the task to be accomplished. In particular, the manipulator is designed to be exchangeable so as to be adapted to the respective task. Thus, the manipulator is detachably connected to the connection element, so that the manipulator can be changed in a simple manner. The position of the connection element can be changed so that the manipulator can be used in different positions relative to the base. As an alternative or in addition thereto, the position of the manipulator within the connection element can be changed, whereby the position of the manipulator relative to the base is also changed and, thus, the manipulator can be used in different positions relative to the base. Thereby, an increased adaptability is achieved, even to tasks unknown at the time of design of the modular end effector. The versatility of the end effector of the present invention is thereby increased, since there is a geometrical change in the position of the manipulator and, thus, for example, portions become accessible which were previously not accessible, without requiring a new design for the end effector. Rather, only the position of the connection element or the position of the manipulator in the connection element is changed such that within the framework of a new task previously not accessible portions, for example of a workpiece, are also accessible. Thus, even newly added tasks can be accomplished using the same end effector without requiring a new design.

Preferably, the base comprises a first segment and at least a second segment. Here, the first segment and the second segment are movably connected to each other such that the position of the first segment relative to the second segment can be changed. Furthermore, the first segment and the second segment each include at least one connection element, so that the position of the connection elements of the first segment can be changed relative to the position of the connection elements of the second segment. Thus, a change in the geometry of the base is possible, whereby the position of the connection elements on the first segment and the second segment changes relative to each other. Thereby, the versatility of the modular end effector is further increased. Such a change in the geometry of the base of the modular end effector e.g. allows a change in the opening width of the end effector so as to be able e.g. to grip larger objects. Thus, in the case of a change in the task posed, which e.g. provides for larger objects to be gripped, no new design of the end effector is required, since the requirements can be met by changing the geometry of the base of the end effector.

Preferably more than one manipulator can be connected to one of the respective connection elements. If in this case the position of the connection element can be changed, a simultaneous change of position of all manipulators connected to the respective connection element is effected. As an alternative or in addition thereto, it is possible to change the position of all manipulators within a respective connection element.

Moreover, the present invention relates to an alternative modular end effector comprising a base which includes at least two connection elements. Here, at least one manipulator can be connected to the connection elements. Specifically, the manipulator can be connected to the connection elements in an exchangeable manner, so that the manipulators can be exchanged quickly. To this end, the manipulators are in particular detachably connected to the connection elements. According to the present invention, at least one manipulator is provided, so that it is possible that a connection element does not have a manipulator depending on the task to be accomplished. According to the present invention, the base comprises a first segment and at least one second segment, the first and second segments being movably connected to each other so that the position of the first and second segments can be changed relative to each other. Thereby, the geometry of the base can be changed. Here, at least one of the connection elements is arranged on each of the first and second segments, so that by changing the position of the first segment relative to the second segment, the position of the connection elements of the first segment relative to the position of the connection elements of the second segment can be changed. Because of the changes in the geometry of the base due to the provision of first and second segments, the modular end effector according to the present invention is easily adapted to new tasks, without the need for a new construction.

The following invention relates to each of the above-mentioned alternatives of the modular end effector according to the present invention.

Preferably, the base comprises more than two segments, which are in particular movable with respect to each other. Here, in particular, each of the segments provided comprises at least one connection element, so that by movement of the segments, the position of the respective connection elements can be suitably adapted to the task posed, thus further increasing the versatility of the modular end effector.

Preferably, the position of at least two segments of the base can be changed with respect to each other by shifting them towards each other. As an alternative, in the case of at least two segments, the two segments are pivoted about a common axis of rotation. However, especially if a plurality of segments is provided, a combination of shifting and pivoting is also possible in order to provide a versatile end effector which is easily adapted to the requirements of the respective tasks.

Preferably, the end effector comprises more than one connection element, in particular more than two connection elements and, particularly preferred, more than five connection elements, whereby it is possible in particular to achieve a non-human hand configuration. Here, at least one manipulator can be connected to each of these connection elements, so that if more than five connection elements are provided, it is also possible to connect more than five manipulators, in particular interchangeably, to the respective connection elements. As an alternative, it is also possible to connect a plurality of manipulators to one connection element, so that an optional number of manipulators can be connected to the connection elements.

Preferably, the position of more than one connection element can be changed, so that it is ensured that the positions of the respective connection elements can be adapted on a large scale. In this context it is preferred that the positions of all the connection elements can be changed, so that the modular end effector can be adapted to the full extent. In particular, the positions of the connection elements can be changed independently of each other. As an alternative or in addition to this, the position of more than one manipulator within a connection element can be changed. Here, it is preferred that the position of all manipulators within a connection element is designed to be changeable so as to be able to ensure the greatest possible adaptability of the modular end effector. The positions of the manipulators within a connection element are changed in particular independently, so as to be able to ensure the highest possible degree of freedom for the required adaptability to e.g. a new task. Thus, the positions of one, a plurality or all connection elements, the positions of one, a plurality or all manipulators within a connection element and/or the positions of one, a plurality or all manipulators in each of the connection elements can be changed, so that maximum versatility with respect to the adaptability of the modular end effector is ensured.

Preferably, more than one manipulator and in particular more than five manipulators are provided, the number of connection elements preferably corresponding to the number of manipulators. Thus, one connection element is preferably provided for each of the manipulators. As an alternative, however, the number of manipulators can be selected higher and can be suitably adapted to the tasks posed.

Preferably, the manipulator is an actuated finger, a tool, a sensor or a light source. As an example of a tool, the manipulator may be a screwdriver, magnetic holder, welding probe or the like. As an example of a sensor, the manipulator may be an optical sensor e.g. a camera, a temperature sensor, a radiation sensor, an electrical measuring device for current or voltage and the like. Specifically, the manipulator may be any active or passive component. In particular, the manipulator, if designed as an actuated finger, comprises actuation elements such as e.g. servomotors in order to change the pose of the finger. Here, the actuated finger is not restricted to a three-part human configuration, but can have a plurality of actuated and thus movable members.

Preferably, at least one connection element comprises linear mobility to change the position of the connection element. As an alternative or in addition, at least one manipulator has linear mobility within a connecting element to change the position of the manipulator. Thus, by moving the connection element or the manipulator within the connection element, a change in position can be effected in order to adapt the modular end effector to a new task. Here, e.g. low-friction sliding elements can be used to linearly change the position. Here, preferably, more than one connection element and/or more than one manipulator has linear mobility.

Preferably, at least one connection element has rotational mobility for the purpose of changing the position of the connection element. As an alternative or in addition, at least one manipulator within a connection element has rotational mobility for the purpose of changing the position of the manipulator. Thereby, further adaptability of the modular end effector is guaranteed. It is preferred in this context that more than one connection element and/or more than one manipulator have rotational mobility.

Preferably, the position of at least one connection element and/or the position of at least one manipulator within a connection element can be changed manually. Here, preferably, the positions of all connection elements and/or the positions of all manipulators within a connection element or within the respective connection element can be changed manually.

Preferably, the position of at least one segment and in particular the position of all segments of the base relative to each other can be changed manually.

Preferably, a release element arranged on at least one connection element is provided, so that by means of the release element a locking of the position of the connection element can be released and thus the position of the connection element can be changed. As an alternative or in addition, a release element is provided on the manipulator, the release element being able to release a locking of the position of the manipulator within a connecting element, so that the position of the manipulator can be changed. As an alternative or in addition, a release element is arranged on the base, so that the locking of the position of the segments of the base can be released by the release element so that the position of the segments of the base can be changed relative to each other. By providing such a release element, it is possible to quickly adapt the modular end effector and, in particular, the change in geometry of the base as well as the position of the manipulator, i.e. also during the operating time, without requiring significant redesigning.

Preferably, the position of at least one connection element and preferably of all connection elements can be changed automatically. Here, an automatic change in position can be effected, e.g. by means of an actuator or the like, which is addressed by a control of the end effector. As an alternative or in addition, the position of at least one manipulator within the respective connection element can be changed automatically, and preferably the position of all manipulators within a connection element or the respective connection element can be changed automatically. As an alternative or in addition, the position of at least one segment and preferably the positions of all segments of the base relative to each other can be changed automatically. Thus, it is easy to adapt the modular end effector to new tasks, even if, e.g. in space applications, no direct access to the end effector is possible. Here, the geometry or the position of the connection element or the manipulator is changed e.g. by an actuator on the basis of a control command issued by a control of the modular end effector.

Preferably, a release element is provided, especially when the connection elements, the manipulators and/or the segments are in an automatically changeable position, the device being in the form of a worm gear, a ratchet or a braking device. This offers the advantage of a stable fixation of the connection elements, manipulators and/or segments, thereby increasing stability. At the same time, energy consumption can be reduced since an actuator is no longer required to maintain the connection element, the manipulator and/or the segment in position. In particular, such actuators for maintaining position can be completely omitted, preferably existing actuators can be simple, so that weight can be saved.

Preferably, the position is changed electrically, pneumatically or hydraulically. Of course, a combination thereof is also possible, so that rapid adjustment is effected e.g. pneumatically, whereas fine adjustment is effected electrically or the like.

Preferably, at least one and preferably all connection elements have connections which fit a variety of different manipulators, so that it is possible to exchange the manipulators quickly. Thus, standard connections are provided which allow the manipulators to be exchanged quickly and in particular further increase the versatility of the modular end effector, since each of the possible manipulators can be attached and connected to each of the connection elements.

Preferably, the base has a surface element forming the inner surface of the end effector, i.e. precisely the gripping surface. Here, the surface element is at least partially interchangeable. Thereby, the surface element can also be adapted to the task of the modular end effector to be accomplished. As an alternative or in addition, the surface element has different areas, wherein individual areas have different materials. Thus, the surface element can be adapted in a purposeful manner to the areas to be obtained, so that, e.g. one area comprises a hard surface for precise gripping, whereas another area comprises an elastic surface that additionally has an anti-slip effect to guarantee a secure grip. Here, it is particularly preferred that individual areas are interchangeable, in order to further increase the adaptability of the modular end effector.

Preferably, when actuated fingers are used as manipulators, the position of the connection elements and/or the manipulators within the connection elements can be adjusted such that there is more than one pair of manipulators acting against each other. There is only one pair in the human hand, e.g. made up of the index finger and thumb. In the present modular end effector it is possible to form a further pair by means of further manipulators, with one of the manipulators taking over the function of another thumb and another manipulator assuming e.g. the function of the middle finger. Thus, two pairs of manipulators acting against each other are provided, whereby e.g. two or more objects can be gripped simultaneously or a gripped object can be manipulated by the second pair of manipulators acting against each other. Here, for example, a gripped object can be easily rotated in the hand or be brought into another orientation without requiring a second hand or putting the object down.

Preferably, when using actuated fingers as manipulators, the position of the connection elements and/or the manipulators within the connection elements can be adjusted such that at least two actuated fingers can be combined, so that the two combined actuated fingers perform their movement in synchronized manner, i.e. simultaneously and uniformly, for mutual reinforcement. Thus, e.g. if a greater force is required, the position of the connection elements and/or the manipulators within the connection elements can be adapted such that the movement requiring said force is effected simultaneously by two actuated fingers and their force is thus added. Hereby, it is also possible to avoid damage to the actuated fingers, since stability is increased by combining the two actuated fingers.

Preferably, when using actuated fingers as manipulators, the position of the connection elements and/or the manipulators within the connection elements can be adjusted such that the position of the actuated fingers corresponds to a humanoid configuration. This facilitates transmission in a teleoperation mode as a control element in a human-machine interface, in which the movement of a human hand is detected and then transmitted to the end effector. A complicated conversion of the movement of the human hand to a non-human configuration is omitted, since the actuated fingers are arranged as manipulators in a humanoid configuration.

Preferably, the base comprises at least one position sensor for detecting the position of the segments of the base. As an alternative or in addition, the base includes at least one force sensor for detecting the forces acting on the base. Preferably, a plurality of position sensors is provided, specifically a position sensor for each of the segments provided, for the purpose of an exact determination of the position of the segments of the base.

Preferably, when using actuated fingers as manipulators, these actuated fingers include position sensors as well as force sensors for carrying out and monitoring an exact movement.

Moreover, the present invention relates to a robot with at least one modular end effector as described above.

Preferably, the robot is a robot arm with in particular six and preferably seven degrees of freedom.

The invention will be explained in more detail below based on preferred embodiments and with reference to the accompanying drawings.

DETAILED DESCRIPTION OF THE INVENTION

Figure 1:
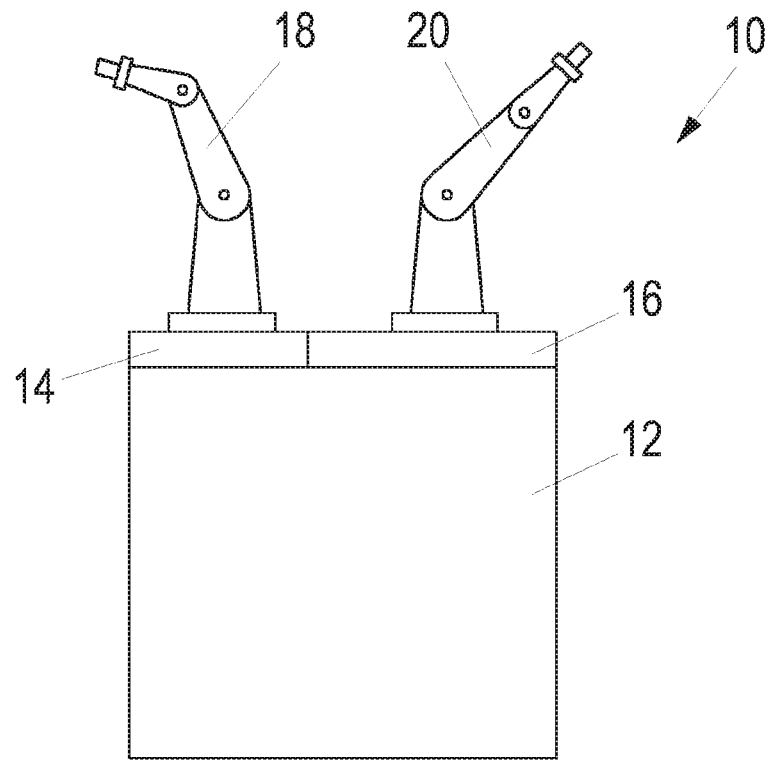
FIG. 1 shows a schematic illustration of a first embodiment of the modular end effector in a first configuration.

The modular end effector 10 according to the present invention comprises a base 12 having a first connection element 14 and a second connection element 16. Here, a first manipulator 18, illustrated as an actuated finger in FIG. 1, is connected to the first connection element 14. However, the first manipulator 18 is not limited to this, so that it can also be e.g. a tool, a sensor such as e.g. a movable camera or a movable light source. In general, the manipulator 18 can be any active or passive element required in the context of the task to be accomplished by the modular end effector. The actuated finger is also not restricted to a three-part structure and may have more or fewer actuated limbs.

Figure 2:
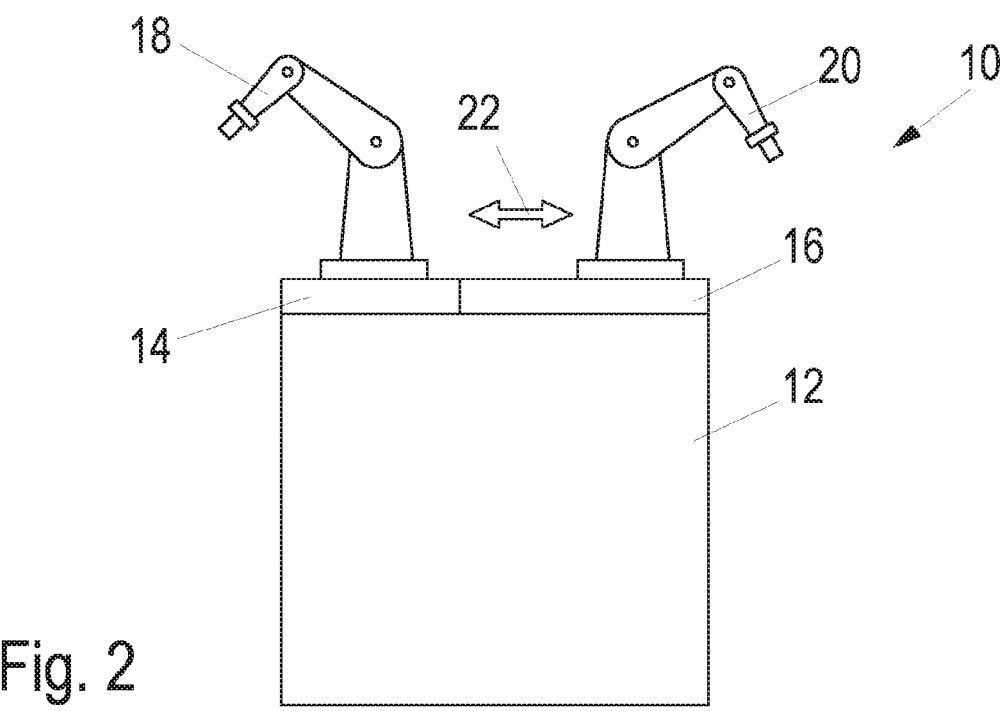
FIG. 2 shows the modular end effector of FIG. 1 in a second configuration.
Figure 3:
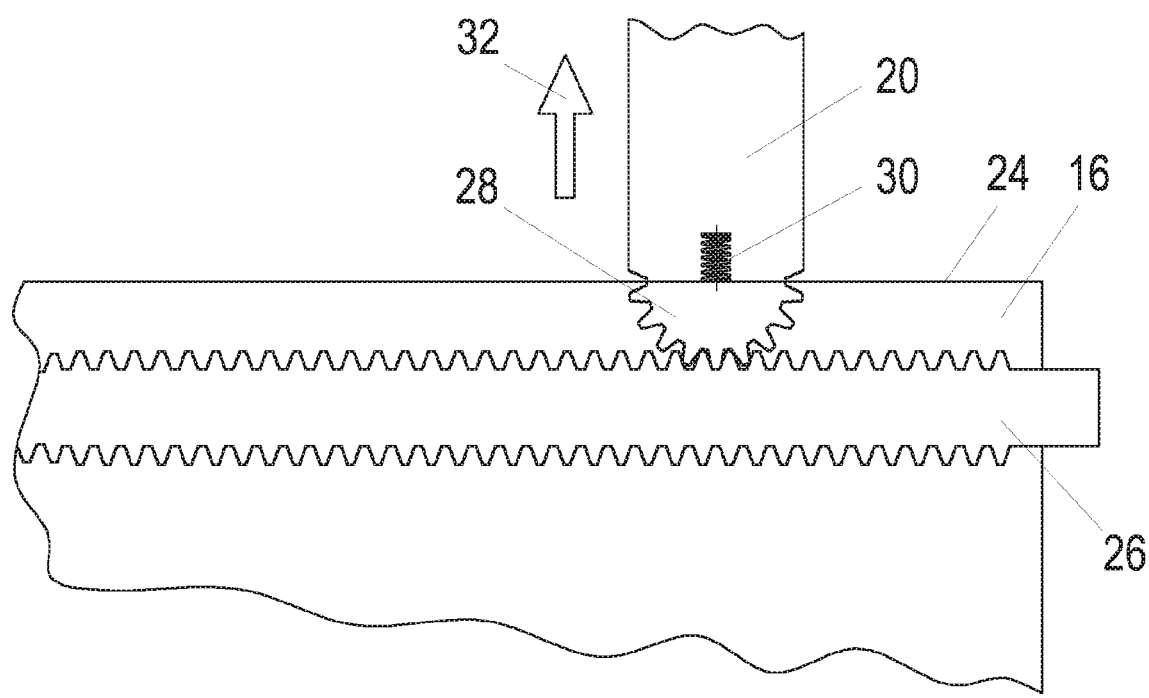
FIG. 3 shows a detailed view of the locking device.

A second manipulator 20 is connected to the second connection element 16, also shown schematically as an actuated finger in FIG. 1. Here, the second manipulator 20 can be displaced linearly within the second connection element 16 in accordance with the arrow 22 illustrated in FIG. 2, so that the position of the second manipulator 20 changes and can thus be adapted to a new task without requiring a new design of the modular end effector 10. To obtain the linear mobility of the second manipulator 20, for example, linear sliding elements 24 (FIG. 3) can be provided, within which the second manipulator 20 can be displaced so as to be moved to a different position. The linear change in position can be caused e.g. by turning a grub screw 26 meshing with a tooth element 28 of the second manipulator 20. In addition, the tooth element 28 is spring-loaded in the direction of the grub screw 26 by a spring 30. Here, the toothed element 28 can be moved along the arrow 32 against the spring load, so that the toothed element 28 is no longer in engagement with the grub screw 26. It is then possible to move the second manipulator 20 freely within the linear sliding element 24. Thereby, a quick manual change of the position of the manipulator is possible.

As an alternative, however, it is also possible for the position change of the second manipulator 20 to happen automatically, e.g. by means of an electrical actuator or e.g. by means of a motor-operated grub screw which is in engagement with a toothed element of the second manipulator element 20. Then, an automatic change in the position of the second manipulator element 20 can be achieved by moving the actuator (not shown) or by rotating the grub screw via the motor.

Hereinafter, identical or similar components are identified by the same reference numerals.

Figure 4:
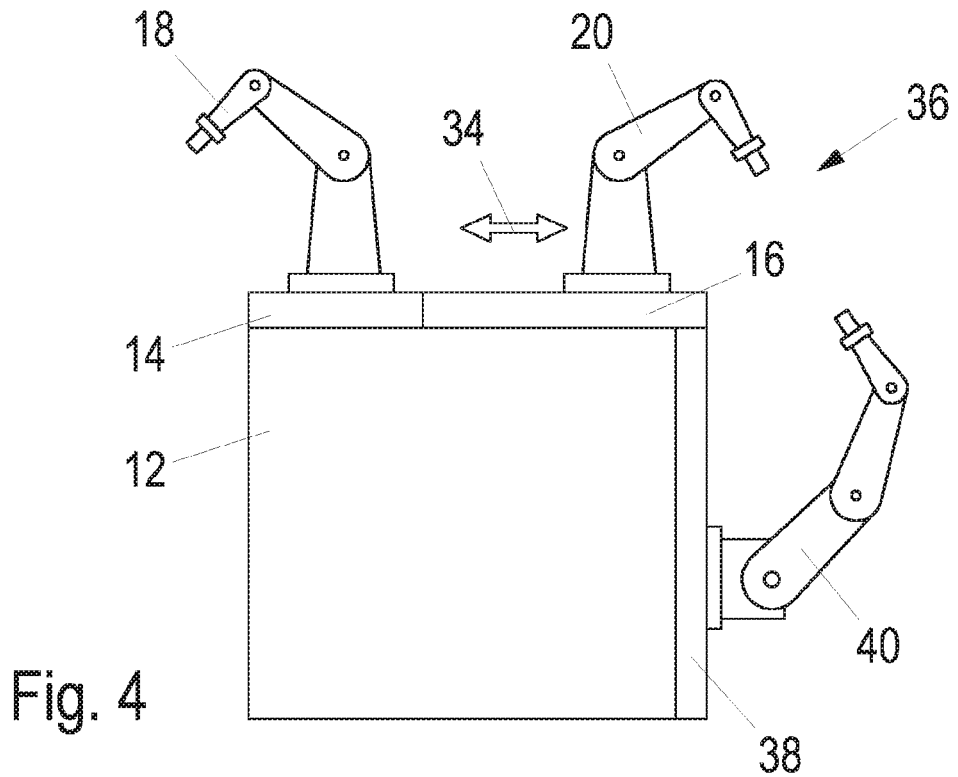
FIG. 4 shows a further embodiment of the modular end effector in a first configuration.
Figure 5:
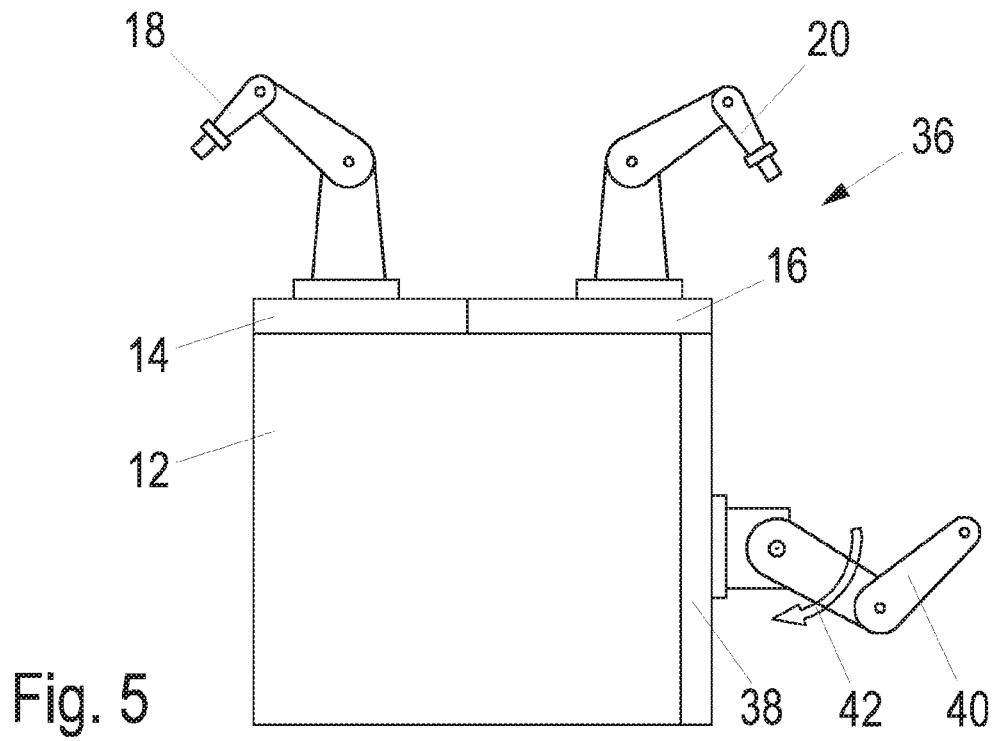
FIG. 5 shows the modular end effector of FIG. 4 in a second configuration.

In the embodiment of the end effector 36 illustrated in FIG. 4, the position of the second manipulator element 20 can also be changed corresponding to the arrow 34, the second manipulator element 20 being provided with linear mobility for this purpose. In addition, the modular end effector 36 of FIG. 4 comprises a third connection element 38 to which a third manipulator 40 is connected. Here, the third manipulator 40 is in turn designed as an actuated finger, which again is only an example. The third manipulator element 40 has rotational mobility corresponding to the arrow 42 (FIG. 5), so that the position of the third manipulator 40 can be adjusted. Thus, it is possible e.g. due to the rotational adaptability of the position of the third manipulator 40 to grasp elements that the modular end effector 36 was previously not able to grasp. Thus, if the task to be accomplished is changed, it is no longer necessary to redesign the modular end effector.

Figure 6:
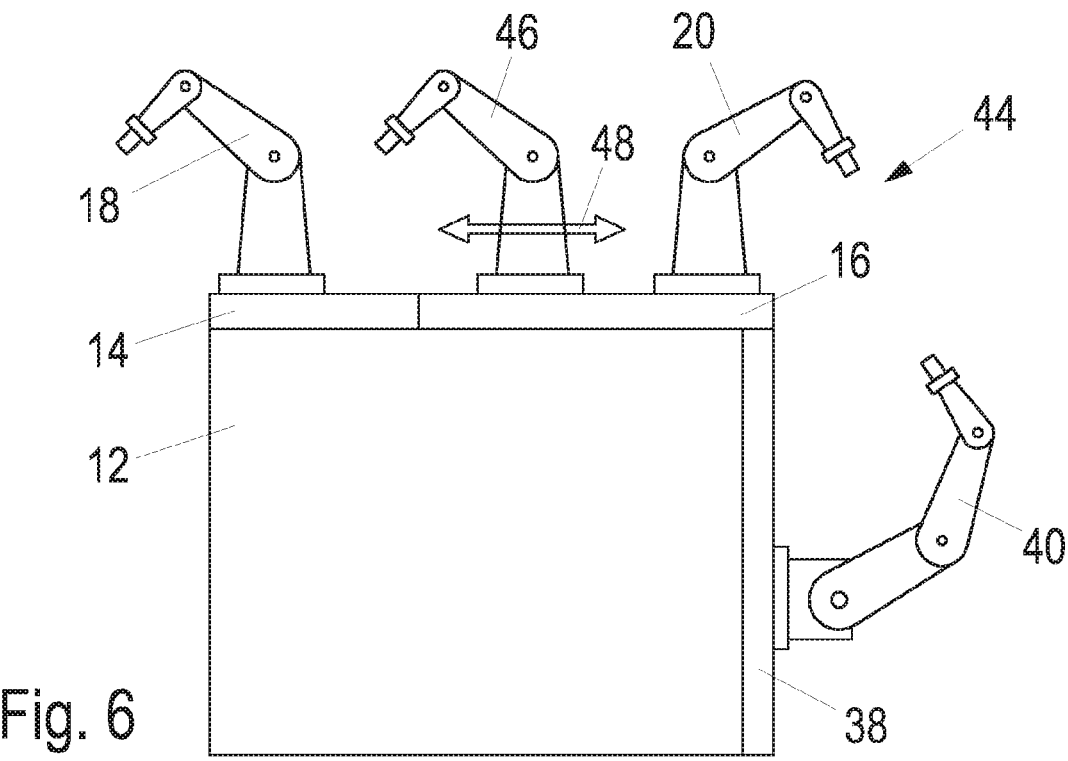
FIG. 6 shows a further embodiment of the modular end effector in a first configuration.

In the embodiment of FIG. 6, the modular end effector 44 comprises a fourth manipulator 46. The same is connected to the second connection element 16. Here, the position of the fourth manipulator 46 can be adapted to the respective requirements corresponding to the arrow 48. Thus, both the second manipulator 20 and the fourth manipulator 46 are connected to the second connection element 16 and are movable within this connection element 16, so that the position can be adapted to the tasks to be accomplished.

Figure 7:
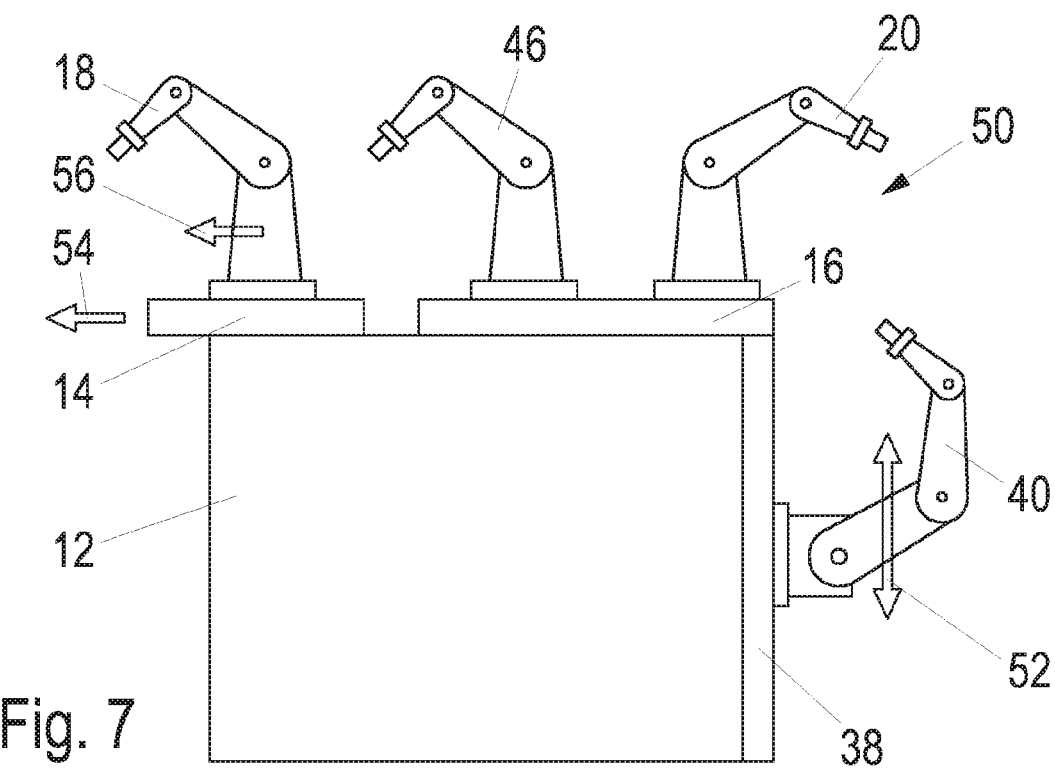
FIG. 7 shows the modular end effector of FIG. 6 in a second configuration.

In the embodiment of the modular end effector 50 illustrated in FIG. 7, the third manipulator 40 has, in addition to the rotary mobility for adapting the position of the manipulator, linear mobility corresponding to the arrows 52, as already described above. Thus, the position of the third manipulator 40 can be adjusted both in a rotary manner and in a linear manner, whereby a high degree of adaptability and thus a great versatility of the modular end effector 50 is achieved. Moreover, the position of the first connection element 14 can be changed corresponding to the arrow 54. Thereby, the position of the first manipulator 18 also changes corresponding to the arrow 56. Here, the change in the position of the first connection element 14 can be supplemented by a mobility of the first manipulator 18, e.g. in relation to the second and third manipulators, in the manner described above.

Figure 8:
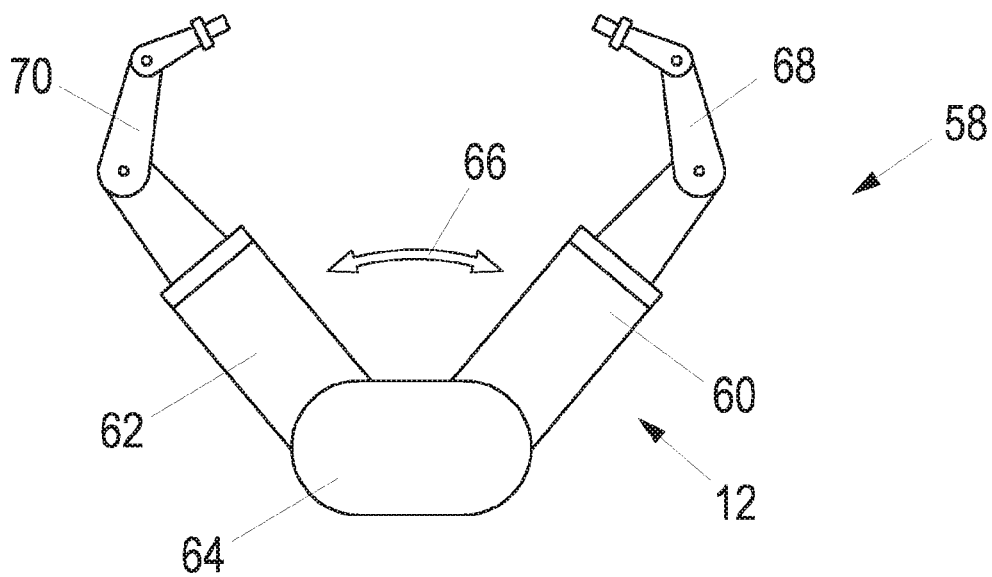
FIG. 8 shows a further embodiment of the modular end effector according to the invention.

The modular end effector 58 illustrated in FIG. 8 includes a base 12 having a first segment 60 and a second segment 62. Here, the first segment 60 and the second segment 62 are movably connected to each other via a common pivot point 64, so that the first segment 60 and the second segment 62 can be pivoted against each other corresponding to the arrow 66. In the embodiment illustrated, the first segment 60 comprises a first manipulator 68. Likewise, the second segment 62 comprises a second manipulator 70. By changing the position of the first segment 60 and the second segment 62 relative to each other, the positions of the first manipulator 68 and the second manipulator 70 also change, so that their positions can be adapted to a modified task and a versatile end effector is thus provided.

Figure 9:
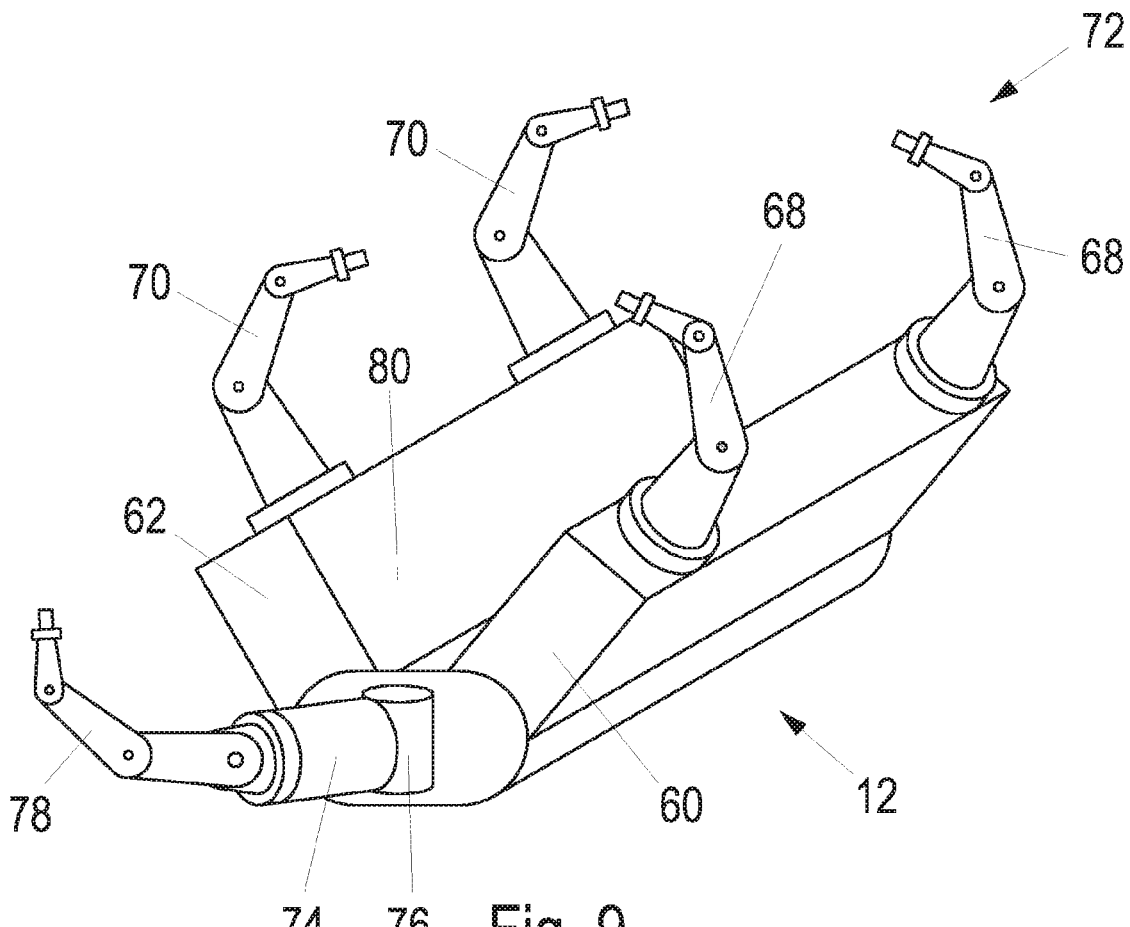
FIG. 9 shows a further embodiment of the modular end effector according to the invention.

In the embodiment illustrated in FIG. 9, the modular end effector 72 includes a base with a first segment 60 and a second segment 62. Here, two manipulators 68 are connected to the first segment 60 and are illustrated as actuated fingers in the example depicted. Likewise, two manipulators 70 are connected to the second segment 62, which are also illustrated as actuated fingers. Here, both the manipulators 68 of the first segment 60 and the manipulators 70 of the second segment 62 can have translational or rotational mobility to ensure a further improved adaptability of the modular end effector 72. Moreover, in the modular end effector 72 of FIG. 9, a third segment 74 of the base 12 is provided, which is connected to the first segment 60 and the second segment 62 via a pivot point 76. Thus, the position of the third segment 74 of the base 12 can be changed and can thus be adapted to new or modified tasks. The third segment 74 of the base 12 comprises a manipulator 78, which in turn is implemented as an actuated finger.

Moreover, the end effector 72 of FIG. 9 comprises an exchangeable surface element 80, wherein the surface element 80 is able to be adapted to the respective task. Here, the surface element 80 can be divided so that different portions have functionally different materials, depending on the task to be accomplished.

Because of the changeability of the position of the connection elements and/or the position of the manipulators within the connection elements, together with the possibility of changing the geometry of the base, a modular end effector is provided that is easily adapted to changing tasks. In this context, it is understood that the features of the above embodiments can be freely combined with each other to further increase the maximum adaptability of the modular end effector. Specifically, the invention is not restricted to a specific number of manipulators or segments of the base. Furthermore, the invention is not restricted to the type of manipulators used.

Figure 10:
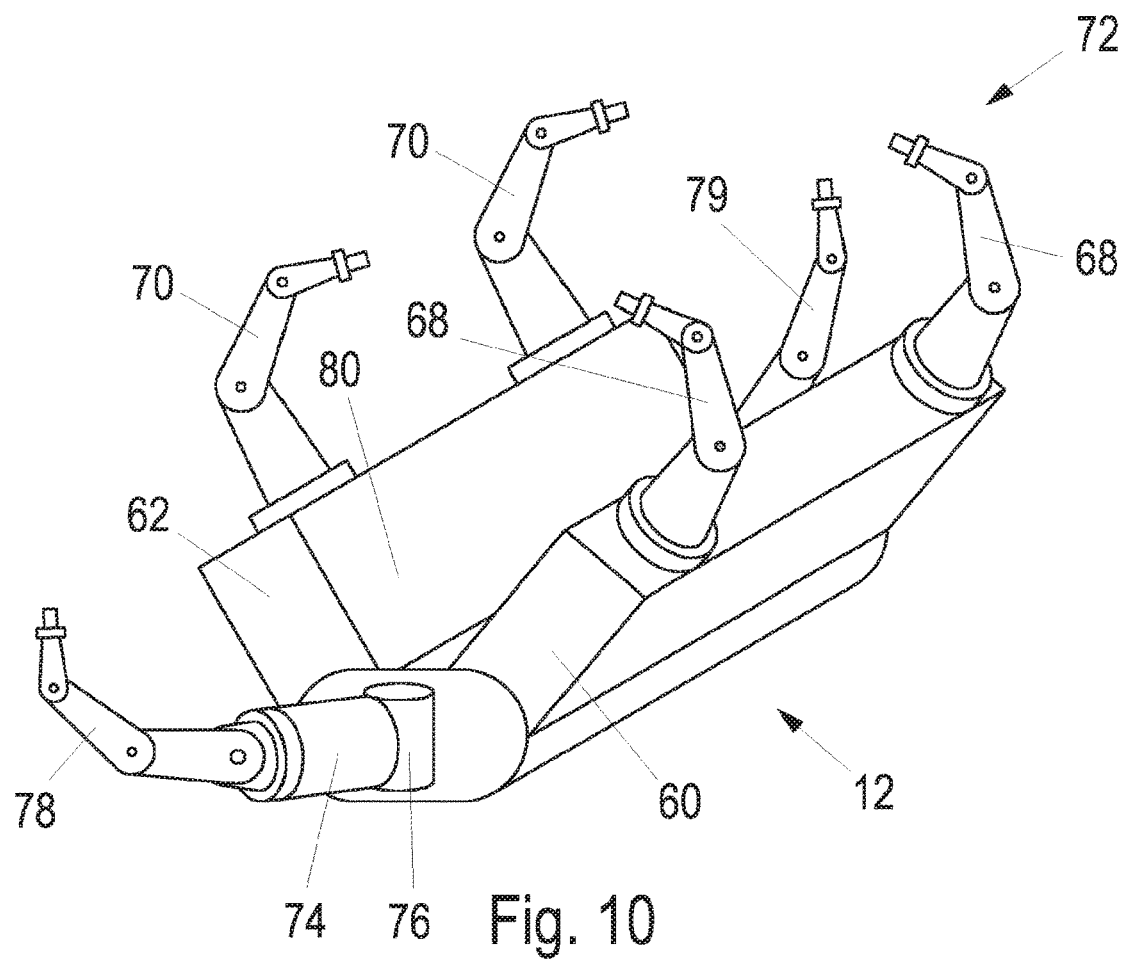
FIG. 10 shows a further embodiment of the modular end effector.
Figure 11:
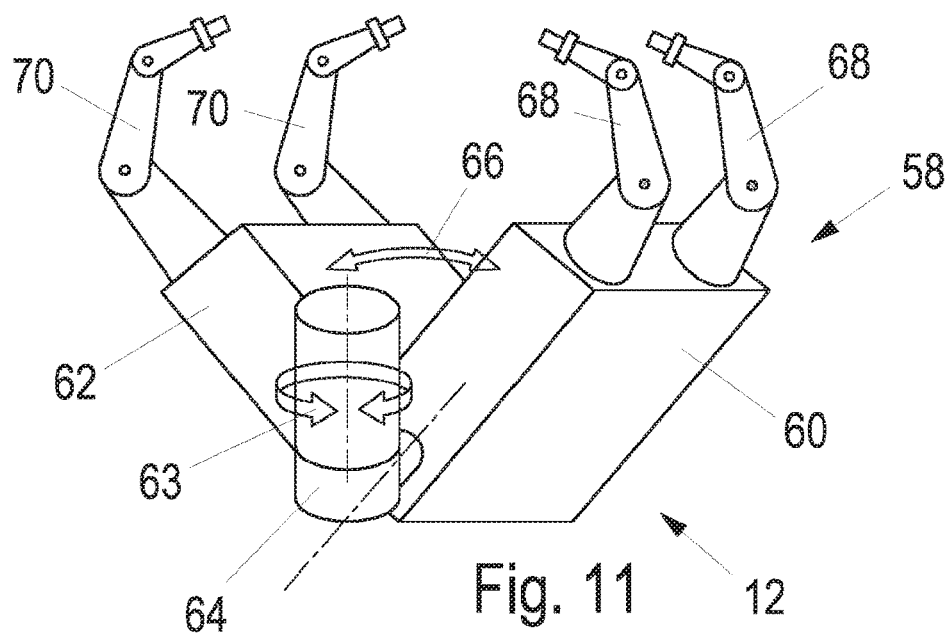
FIG. 11 shows a further embodiment of the modular end effector according to the invention.

The modular end effector illustrated in FIG. 10 is constructed as described above with reference to FIG. 9. In addition, however, the former has a second rotatable manipulator 79. Thus, non-human configurations/arrangements of the manipulators can be provided by the existing manipulators. In particular, several force pairs can be formed, so that it is possible to simultaneously grip more than one object or to simultaneously grip and process an object. The manipulators 70, which are connected to the second segment 62, and/or the manipulators 68 of the first segment 60 can each cooperate, so that the force of the manipulators is added or a higher stability of the manipulators is achieved. Here, the manipulators 70 of the second segment are moved synchronously. If also the manipulators 68 of the first segment are provided so as to cooperate, the manipulators 68 of the first segment are also moved synchronously. Of course, the movements of the manipulators of the first or second segment are independent of each other.

The modular end effector illustrated in FIG. 10 is constructed as described above with reference to FIG. 9. In addition, the end effector has the possibility of rotating the segments 60, 62 of the base 12 relative to each other corresponding to the arrow 63, so that the configuration/geometry of the base can be adapted.

The embodiments illustrated herein are mere examples of the present invention and should therefore not be construed as being limiting. Alternatives provided by a skilled person in consideration of the embodiments are likewise encompassed by the scope of protection of the present invention. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A modular end effector with a base comprising at least one connection element, wherein a manipulator is connected to the at least one connection element, wherein the position of the at least one connection element or the position of the manipulator within the at least one connection element is changeable so that the manipulator can be used in different positions relative to the base in pose and position, wherein more than one manipulator is simultaneously connected to one of the connection elements, wherein the connection elements comprise connections suitable for a plurality of different manipulators, thereby enabling attachment and exchange of each of the plurality of manipulators to each of the connection elements without the need to fit a certain manipulator with a certain connection element, wherein the base comprises a first segment and at least one second segment, the first segment and the at least one second segment being movably connected to each other, so that the position of the first segment and the at least one second segment can be changed relative to each other, the first segment and the at least one second segment each comprising at least one connecting element so that the position of the at least one connecting element of the first segment can be changed relative to the position of the at least one connecting element of the at least one second segment, and wherein at least one connection element has linear mobility for the purpose of changing the position of the connection element, or at least one manipulator is linearly movable within one of the connection elements for changing the position of the manipulator.

2. A modular end effector comprising:
a base with at least two connection elements; and
at least one manipulator being connectable with the at least two connection elements,
wherein the base comprises a first segment and at least one second segment, where the first segment and the at least one second segment are movably connected to each other so that the position of the first segment and the at least one second segment relative to each other can be changed,
wherein the first segment and the at least one second segment respectively have at least one connection element, such that the position of the at least one connection element of the first segment relative to the position of the at least one connection element of the second segment can be varied,
wherein the at least two connection elements comprise connections suitable for a plurality of manipulators, thereby enabling attachment and exchange of each of the plurality of manipulators to each of the at least two connection elements without the need to fit a certain manipulator with a certain connection element,
wherein each of the at least two connection elements is simultaneously connected to a plurality of manipulators, and
wherein at least one connection element has linear mobility for the purpose of changing the position of the connection element, or at least one manipulator is linearly movable within one of the connection elements for changing the position of the manipulator.

3. The modular end effector of claim 2, wherein the base comprises more than two segments, each segment having at least one connection element.

4. The modular end effector of claim 2, wherein the positions of the first segment and the at least one second segment of the base can be varied relative to each other by shifting them against each other or pivoting them about a common rotation axis.

5. The modular end effector of claim 1, comprising a plurality of connection elements.

6. The modular end effector of claim 1, wherein the positions of the at least one connection element or manipulator within the at least one connection element are changeable independently of each other.

7. The modular end effector of claim 1, comprising a plurality of manipulators, wherein the number of connection elements corresponds to the number of manipulators.

8. The modular end effector of claim 1, wherein at least one manipulator is an actuated finger, a tool, a sensor, or a light source.

9. The modular end effector of claim 1, wherein at least one connection element has rotational mobility for changing the position of the connection element, or at least one manipulator is rotatable within the connection element to change the position of the manipulator.

10. The modular end effector of claim 1, wherein the position of at least one connection element, or the position of at least one manipulator within the connection element, or the position of at least one segment can be changed manually.

11. The modular end effector of claim 1, comprising a release element arranged on the at least one connection element, the manipulator, or the base, so that the release element releases the position of the connection element or the manipulator within the connection element, and the position of the connection element or the manipulator can be changed.

12. The modular end effector of claim 1, wherein the position of at least one connection element, the position of at least one manipulator within the connection element, or the position of at least one segment can be changed automatically.

13. The modular end effector of claim 12, wherein the position is changed electrically, pneumatically, or hydraulically.

14. The modular end effector of claim 1, wherein the base has a surface element which forms an inner surface of the modular end effector, the surface element being at least partially interchangeable or comprising more than one portion, wherein individual portions comprise different materials.

15. The modular end effector of claim 8, wherein, when using actuated fingers as manipulators, the position of the at least one connection element or the manipulators within the at least one connection element are adapted such that there is more than one pair of manipulators acting against each other.

16. The modular end effector of claim 8, wherein, when using actuated fingers as manipulators, the position of the at least one connection element or the manipulators within the at least one connection element are adapted such that at least two actuated fingers can be combined, so that the at least two actuated fingers execute their movements synchronously for mutual reinforcement.

17. The modular end effector of claim 8, wherein, when using actuated fingers as manipulators, the position of the at least one connection element or the manipulators within the at least one connection element are adapted such that the position of the actuated fingers corresponds to a humanoid configuration.

18. The modular end effector of claim 1, wherein the base comprises at least one position sensor for detecting the position of segments or at least one force sensor for detecting the forces acting on the base.

19. A robot comprising at least one modular end effector of claim 1.

20. The robot of claim 19, wherein the robot is a robot arm having six or more degrees of freedom.

* * * * *